United States Patent [19]

Pusch

[11] Patent Number: 4,621,012

[45] Date of Patent: Nov. 4, 1986

[54] CAMOUFLAGE NET HAVING A SEMICONDUCTIVE LAYER

[76] Inventor: Gunter Pusch, Bannholzweg 12, 6903, Neckargemund 2, Fed. Rep. of Germany

[21] Appl. No.: 671,562

[22] Filed: Nov. 15, 1984

[51] Int. Cl.[4] .................................. B32B 5/16
[52] U.S. Cl. ........................ 428/242; 156/240; 427/160; 427/162; 427/404; 428/244; 428/246; 428/252; 428/283; 428/329; 428/408; 428/457; 428/919; 428/938
[58] Field of Search ............... 428/938, 240, 241, 242, 428/244, 252, 283, 285, 328, 329, 408, 919, 245, 246, 457; 427/160, 162, 404; 156/240

[56] References Cited

U.S. PATENT DOCUMENTS

| 3,591,400 | 7/1971 | Palmaquist et al. | 428/242 |
|---|---|---|---|
| 3,733,606 | 5/1973 | Johansson | 428/919 |
| 4,435,465 | 3/1984 | Ebneth et al. | 428/244 |
| 4,465,731 | 8/1984 | Pusch et al. | 428/919 |
| 4,467,005 | 8/1984 | Pusch et al. | 428/240 |
| 4,495,239 | 1/1985 | Pusch et al. | 428/919 |
| 4,528,229 | 7/1985 | Gottlieb | 428/919 |
| 4,529,633 | 7/1985 | Karlsson | 428/919 |
| 4,533,591 | 8/1985 | Sorko-Ram | 428/242 |

FOREIGN PATENT DOCUMENTS

| 1941216 | 4/1971 | Fed. Rep. of Germany | 428/244 |
|---|---|---|---|
| 1605131 | 12/1981 | United Kingdom . | |

*Primary Examiner*—James J. Bell
*Attorney, Agent, or Firm*—Michael N. Meller

[57] ABSTRACT

The camouflage material, effective in the spectral range from visible light to radar waves, is made up of sequential layers of a textile fabric base, a thermoplastic coating containing randomly distributed dipole materials having a rod-like shape and semiconductive properties to absorb radar rays, a metallic layer to reflect infrared radiation and capable of transmitting radar waves and an outer optically camouflaging paint.

21 Claims, 4 Drawing Figures

CAMOUFLAGE NET HAVING A SEMICONDUCTIVE LAYER

BACKGROUND OF THE INVENTION

The invention relates to camouflage materials, particularly to be employed for military targets, effective in the spectral range from visible light to radar waves.

In U. S. patent application, Ser. No. 459,354, filed Dec. 16, 1982, now U.S. Pat. No. 4,495,239 issued Jan. 22, 1985, there is disclosed a camouflage material, effective in the spectral range from visible light to radar waves, which comprises a base layer coated with a homogeneous metal layer reflective in the range of terrestrial thermal radiation as well as in the radar region of the spectrum (3 MHz to 3000 MHz) and having a surface resistivity of not more than 0.5 to 10 ohms per square and a subsequent coating of a camouflage paint containing pigments having reflective properties in the visible and near IR spectrial regions that are similar to the natural background and containing a binder having high transparency in the 3–5 $\mu$m and 8–14 $\mu$m atmospheric windows of the far infrared, region of the spectrum. The paint is applied so that its emissivity in those windows will vary over the surface of the material.

British Pat. No. 1,605,131, published Dec. 16, 1981, discloses thermally structured camouflage materials having a surface which is highly reflective.in the far infrared region of 3–5 $\mu$m and 8–14 $\mu$m and has a coating of a camouflage paint containing a pigment having camouflage properties in the visible and near IR range and containing a binding agent having an emissivity less than 90% in the 3–5 $\mu$m (window II) and 8–14 $\mu$m window III) range. The emissive power in windows II and III is structured in various ways so that it varies over the surface of the material.

U.S. Pat. No. 3,733,606 addresses the problem of detection by radar by using camouflage material consisting of a multi-layered material both absorbing and reflecting radar signals. At least one layer is a thin, non-homogeneous electrically conducting film having a surface resistivity at radio frequencies exceeding 2000 MHz of between 100 and 1000 ohms, but considerably different from 377 ohms, the characteristic impedance of free space, so as to establish reflection for at least 10% of the incident radar.

SUMMARY OF THE INVENTION

The present invention has as its object to provide a camouflage material which will be effective in the spectral range from visible light to radar waves, by which the radar waves are absorbed rather than reflected as in the prior art. Accordingly, the camouflaging material according to the invention comprises a laminate with a textile material (or non-woven) fabric base, a soft, thermoplastic coating on the base containing randomly distributed dipole materials which render the coating semiconductive and which absorb radar waves, a metallic layer adhering to said coating capable of reflecting infrared radiation and transmitting radar waves, and finally an optically camouflaging paint layer.

DETAILED DESCRIPTION

Figure 1:
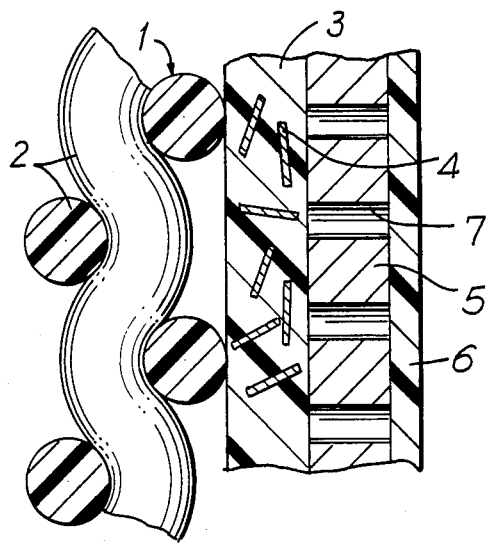
FIG. 1 is a partial cross-section of one embodiment of the material according to the invention.

The textile or non-woven fabric used as the base for the camouflage net according to the invention is suitably a woven or non-woven synthetic textile fabric having a weight of about 80 to 150 g/m$^2$ and is made of polyvinyl, polyamide, polyethylene, polypropylene or polyester fibers, preferably polyamide or polyester.

The thermoplastic coating applied to the base fabric and which incorporates dipole materials, is an IR transparent material such as chlorinated polypropylene, specially formulated polyethylene, or cyclorubber. Polyethylene is preferred. The thickness of the layer is from 50–200 $\mu$m. It incorporates 5–10% by volume of randomly distributed dipole materials having semiconductive properties.

The dipole materials may be semiconducting materials such as silicon, germanium, carbon fibers, graphite selenium, cuprous oxide, lead sulfide, silicon carbide, lead telluride, gallium arsenide and indium antimonide. Carbon fibers are preferred. Or they may be normally conductive materials having a hair-like thickness so that they act as semiconductors. Examples of such materials are aluminum, stainless steel, copper, silver and gold. The semiconductive materials are suitably rod-like in shape and have a length which is about one-half the wavelength of the radar waves to be absorbed (10 cm to 1.5 mm). They should be flexible enough to bend elastically with bending of the laminate during use of the camouflage material. The normally conductive materials may be in the form of a vapor deposited coating 1 to 5 $\mu$m in thickness on plastic strips about half the wavelength of the radar waves to be absorbed. Such semiconductors as silicon and germanium, could also similarly be deposited on such plastic strips.

The metallic layer, which comprises the third layer of the laminate, may be formed in several ways, but in any case, it must be capable of transmitting impinging radar waves so that they may be absorbed by the dipole materials in the thermoplastic semiconductive layer underneath. The metal may be aluminum, copper, zinc and their alloys applied in a thickness of 50–100 $\mu$m. One method of forming the metallic layer is to incorporate platelets of the metal in the thermoplastic layer so that they are oriented perpendicular to the incoming radiation.

Another method of forming the metallic layer is to cover the thermoplastic coating with a metallic paint. In order to enable the passage of radar waves through the metallic paint layer, it is convenient to insert a layer (about 10$\mu$ thick) of unplasticized brittle synthetic resin between the semiconductive layer and the metallic paint layer, which becomes brittle upon drying, e.g. unplasticized polyester. By means of calendaring or other mechanical deformation of the laminate, the paint layer is broken up into small islands with minute spaces inbetween which permit the passage of the radar waves.

A third method of forming the metallic layer is by vapor deposition of the metal under vacuum. This is a well-known technique in the art. Here again, a brittle coating subsequently broken by mechanical deformation, can be employed to cause apertures in the metallic layer to permit passage of the radar waves. Or the coating may be applied so as to be porous, but this is more difficult.

The optically camouflaging paint layer, about 10–100 μm thick, contains inorganic metal compounds, such as metal oxides and metal salts. Commonly sed metal compounds are chromium oxide green, chromium oxide hydrate green, titanium dioxide, iron oxide, zinc oxide, lead dioxide, cobalt oxide and ultramarine blue.

The camouflaging net laminate may be produced by merely forming the layers in sequence, i.e., starting with a textile fabric base and coating thereon first the thermoplastic semiconductive layer containing dipole materials, then, optionally, a layer of adhesive which dries to a brittle coating, followed by the metallic layer and finally the optical paint layer.

On the other hand, the laminate may be formed in two parts to avoid damage to the dipole materials during mechanical deformation of the brittle adhesive layer. The first laminate consists of the textile fabric base coated with the semiconductive thermoplastic layer containing the dipole materials. The second laminate consists of a textile fabric base coated with a release coating about 1μ thick. The release coating suitably consists of a silicone or hydrocarbon wax. This is followed by the optical paint layer, the metallic paint layer, and finally the brittle adhesive layer. After mechanically deforming the second laminate to break up the brittle adhesive layer, and thereby the metallic paint layer, the two laminates are joined by heat and/or pressure preferably at about 10 Newtons/cm² at a temperature of 80°–100° C. so that the semiconductive layer of the first laminate forms an interface with the brittle layer of the second laminate. Then the textile fabric of the second laminate is peeled off from the optical paint layer by means of the release coating on the fabric to form the final laminated camouflaging material.

Figure 2:
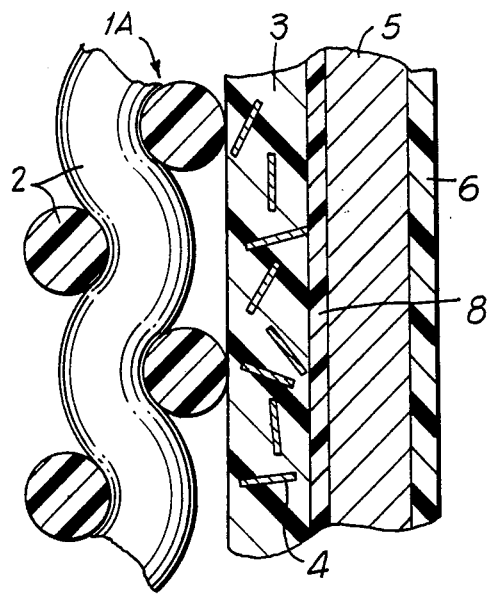
FIG. 2 is a partial cross-section of another embodiment of the material according to the invention.

In FIGS. 1 and 2, two embodiments of the camouflaging material 1 and 1A according to the invention are illustrated. The textile fabric base 2 is coated with a semiconductive thermoplastic layer 3 containing rod-like dipole materials 4. This is followed by a metallic layer 5 having pores 7 and an optically camouflaging paint layer 6. In FIG. 2, a brittle synthetic resin layer 8 is interposed between the metallic layer 5 and the semiconductive layer 3. When subjected to mechanical deformation, the brittle resin layer 8 breaks up and causes small apertures to form in the metallic layer 5 to enable passage of the radar waves into the semiconductive layer containing the dipole materials. The apertures need only be a few microns in order to permit passage of the radar waves.

Figure 3:
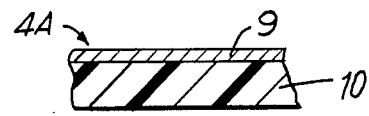
FIG. 3 is a partial cross-section of one embodiment of the dipole material according to the invention.

FIG. 3 illustrates one embodiment 4A of the dipole material 4 which comprises a thin metal coating 9 on a thermoplastic film 10.

Figure 4:
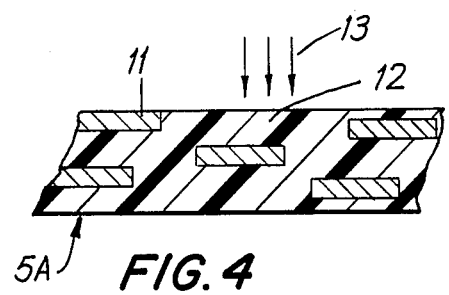
FIG. 4 is a partial cross-section of one embodiment of a metallic layer according to the invention.

FIG. 4 illustrates another embodiment 5A of the metallic layer 5 in which metal platelets 11 are arranged in a thermoplastic layer 12 so that they will be perpendicular to the incident radar waves 13.

EXAMPLE I

A textile fabric of woven polyester fibers about 0.5 mm in diameter is coated with a 50μ thick layer of polyethylene containing 10% by volume of hair-like filaments of stainless steel having a length of 1.5 to 3 mm which function as a semiconductor. A 50 mm thick film of aluminum is vapor deposited in conventional manner under vacuum so as to substantially cover the polyethylene coating but allowing some porosity. The aluminum layer is then coated with a 10 μm layer of chlorinated polypropylene containing an optically camouflaging pattern of chromium oxide green, iron oxide and titanium dioxide.

EXAMPLE II

A first laminate is formed from a textile fabric of nylon filaments having a diameter of about 0.25 mm coated with a 200 μm thick semiconductive layer of IR-transparent specially formulated polyethylene containing carbon fibers having a thickness of 0.1 to 1 mm and a length of 1 to 50 mm.

A second laminate is formed from another layer of the nylon fabric coated with a hydrocarbon wax as a release agent. An optically camouflaging paint layer comprising chromium oxide green, ultramarine blue and iron oxide in a thickness of 50–100 μm is applied over the release agent. This is followed by a vapor deposited coating of aluminum having a thickness of 5–30 nm. Finally, an unplasticized polystyrene layer having a thickness of about 5 μm is applied over the aluminum from a solution in methyl ethyl ketone. After the resin has dried to a brittle layer, the second laminate is calendared to break up the brittle resin and thereby the aluminum into small islands, with minute spaces a few microns wide therebetween. Then the first and second laminates are adhered together by employing a pressure of 10 Newtons/cm² at a temperature of 85° C.

Although the invention has been described with respect to specific embodiments, it will be understood that other variations may be made without departing from the scope of the invention as defined in the following claims.

I claim:

1. A camouflaging material for military targets effective in the spectral range from visible light to radar waves comprising a laminate having in sequence
    (a) a textile fabric base;
    (b) a soft thermoplastic coating on said base containing randomly distributed dipole materials having a rod-like shape and semiconductive properties to absorb radar rays;
    (c) a metallic layer adhering to said coating to reflect infrared radiation and capable of transmitting radar waves; and
    (d) an optically camouflaging paint layer thereon.

2. The camouflaging material as in claim 1, wherein the soft thermoplastic coating is polyethylene.

3. The camouflaging material as in claim 1, wherein the semiconductive dipole materials are selected from the group consisting of silicon, germanium, carbon fibers, graphite, selenium, cuprous oxide, lead sulfide, silicon carbide, lead telluride, gallium arsenide and indium antimonide.

4. The camouflaging material as in claim 1, wherein the semiconductive dipole materials are selected from normally conductive metals, in hair-like thickness, so as to function as a semiconductor.

5. The camouflaging material as in claim 4, wherein said normally conductive materials are selected from the group consisting of aluminum, stainless steel, copper, silver and gold.

6. The camouflaging material as in claim 3, wherein the semiconductive dipole materials have a length which is one-half the wave-length of the radar waves to be absorbed.

7. The camouflaging material as in claim 1, wherein the randomly oriented semiconductive materials occupy 5-10% of the volume of said thermoplastic layer.

8. The camouflaging material as in claim 4, wherein the normally conductive materials are vapor deposited in 1 to 5 $\mu$m thickness on plastic strips.

9. The camouflaging material as in claim 6, wherein said semiconductive dipole materials are sufficiently flexible to elastically bend in the laminate structure of the camouflage material.

10. The camouflaging material as in claim 1, wherein said metallic layer is selected from the group consisting of aluminum, copper, zinc and their alloys.

11. The camouflaging material as in claim 10, wherein said metallic layer is composed of a thermoplastic filled with metallic platelets oriented flat in said layer so as to be perpendicular to the penetration of IR-radiation.

12. The camouflaging material as in claim 10, wherein said metallic layer is a paint of said metal.

13. The camouflaging material as in claim 10, wherein said metallic layer is a vapor-deposited coating.

14. The camouflaging material as in claim 10, wherein there is inserted between said metallic layer and the semiconductive layer a brittle resin layer which upon mechanical deformation of the laminate effectively breaks up said metal layer into small islands with minute spaces therebetween to enable the passage therethrough of radar waves into the absorbing semiconductive layer.

15. The camouflaging material as in claim 1, wherein the camouflaging optical layer is made of an inorganic metal compound.

16. The camouflaging material as in claim 15, wherein said inorganic metal compound is selected from the group consisting of metal salts and metal oxides.

17. The camouflaging material as in claim 1, wherein the semiconducting layer is 50-200 $\mu$m thick; the metal layer is 50-100 $\mu$m thick; and the optically camouflaging paint layer is 10-100 $\mu$m thick.

18. The camouflaging material as in claim 14, wherein said brittle layer is 1-5 $\mu$m thick.

19. A method of producing a laminated camouflaging material for military targets effective in the spectral range from visible light to radar waves comprising applying in sequence upon a textile fabric base
(a) a soft thermoplastic coating on said base comprising randomly distributed semiconductor dipole materials to absorb radar rays;
(b) a metallic layer on said thermoplastic coating to reflect infrared radiation; and
(c) an optically camouflaging paint layer on said metallic layer.

20. The method as in claim 19, wherein there is coated upon said semiconductive layer a hardenable synthetic resin coating which upon drying becomes brittle and then coating thereupon the metallic paint layer followed by the optically camouflaging paint layer.

21. The method as in claim 20, wherein said laminated material is prepared in two major parts by
(i) forming a first laminate from a textile fabric base coated with a soft thermoplastic semiconductive coating comprising semiconductor dipole materials;
(ii) forming a second laminate from another textile fabric base having a release coating thereupon; an optically camouflaging paint layer on said release layer; a metal paint layer on said optically camouflaging paint layer and an adhesive material which upon hardening becomes brittle upon said metal paint layer; then mechanically deforming the second laminate;
adhering said laminates formed in said two major parts at the interface of the thermoplastic semiconductive layer and the brittle layer; and
removing the textile fabric base on top of the optically camouflaging paint layer by peeling it off through the action of the release layer.

* * * * *